Figure 1:
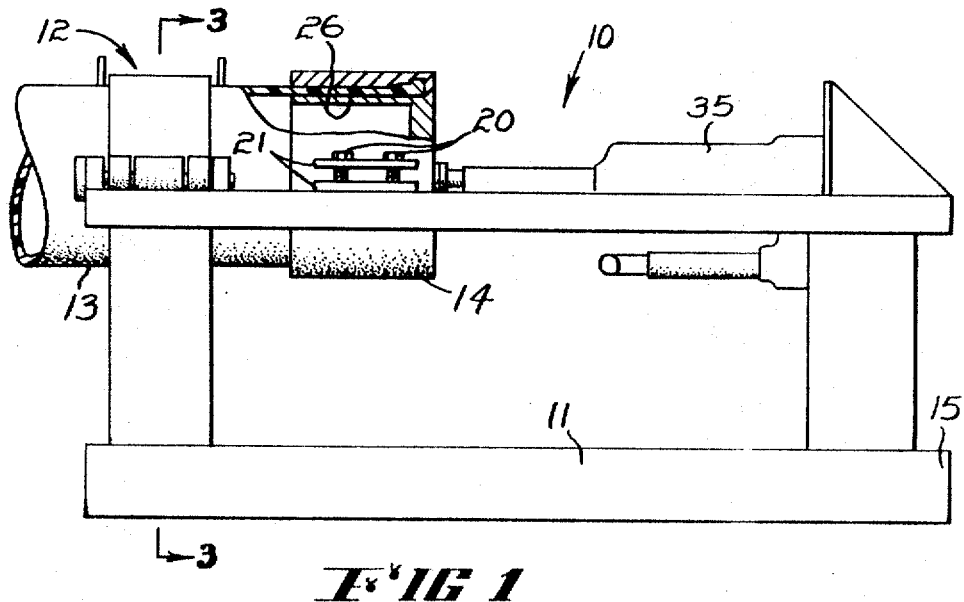

United States Patent

[11] 3,599,287

| [72] | Inventor | Basil Alfred Buck |
| | | Broken Hill, New South Wales, Australia |
| [21] | Appl. No. | 743,349 |
| [22] | Filed | July 9, 1968 |
| [45] | Patented | Aug. 17, 1971 |
| [73] | Assignee | Broken Hill South Limited |
| | | Melbourne, State of Victoria, Australia |
| [32] | Priority | July 10, 1967 |
| [33] | | Australia |
| [31] | | 24296/67 |

[54] END-FORMING TOOL FOR THERMOPLASTIC TUBING
1 Claim, 4 Drawing Figs.

[52] U.S. Cl. ............................................. 18/19 TE
[51] Int. Cl. ............................................. B29c 17/02
[50] Field of Search ............................................. 18/19 TE, 19 BE

[56] References Cited
UNITED STATES PATENTS

| 2,623,267 | 12/1952 | Retz | 279/2 |
| 2,779,996 | 2/1957 | Tanis | 18/19 |
| 3,335,484 | 8/1967 | Parker et al. | 18/19 X |
| 3,341,894 | 9/1967 | Flaming | 18/19 |
| 3,360,826 | 1/1968 | Lorang | 18/19 |
| 3,383,750 | 5/1968 | Schroeder et al. | 18/19 X |
| 3,448,491 | 6/1969 | Sosnowski et al. | 18/19 |

*Primary Examiner*—Andrew R. Juhasz
*Assistant Examiner*—Leon Gilden
*Attorney*—Oldham & Oldman ABSTRACT: A tool, and also a method, for forming a ring on the end of thermoplastic tubing, wherein the tool is provided with a clamp to clamp the tubing near one end and a mold formed from two half molds to clamp over the end, the half molds having an inner annular recess, and a die having a skirt to support the end of the tube against inward collapse, the die and mold being heated to render the tubing plastic, and the die and mold then being urged towards the clamp to force plastic flow of the tubing into the recess in the mold.

INVENTOR
Basil Alfred Buck
By: Oldham and Oldham
Attys

END-FORMING TOOL FOR THERMOPLASTIC TUBING

This invention relates to a tool which is useful to form a protruding ring or collar on the end of a length of thermoplastic tubing.

Thermoplastic tubing is usually joined end to end by employing an internal ferrule and an external clamping device, but this is slow and difficult to fit and is of high cost. The main object of this invention is to provide a tool which can form a protruding ring or collar on the end of thermoplastic tubing thereby enabling standard couplings to be employed to join the tubing, this being both quicker and less expensive.

The invention may, in one of its forms, consist of a tool which is useful for forming a ring on the end of thermoplastic tubing, comprising a frame, a pair of outer tube-engaging members, the first said tube-engaging member being a clamp arranged to clamp over a length of tubing near one end, the second said tube-engaging member being a mold positionable over said end and having an inner annular recess therein, a die insertable in said end, and means to urge one said tube-engaging member towards the other to effect plastic flow of the tubing into the annular recess.

Figure 2:
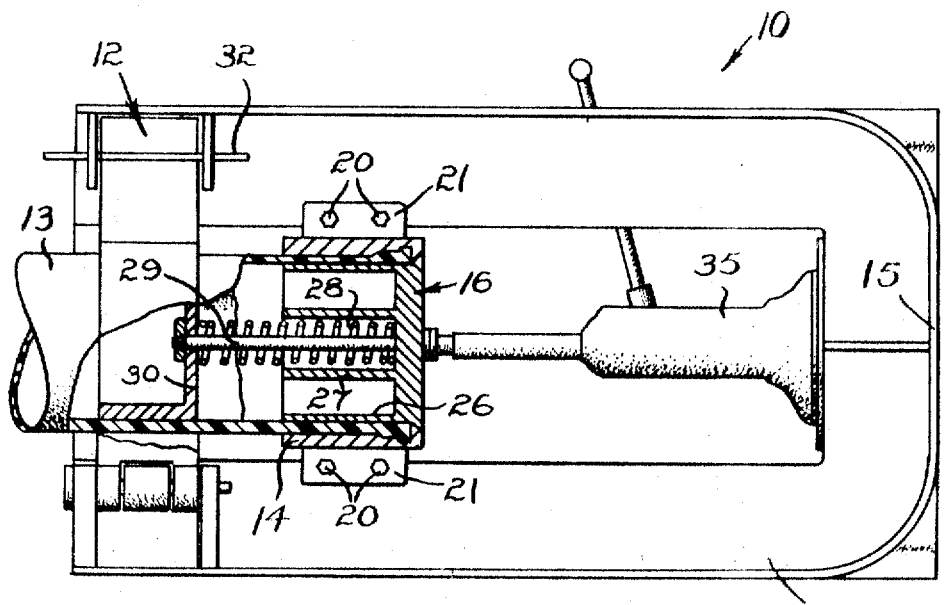
Figure 3:
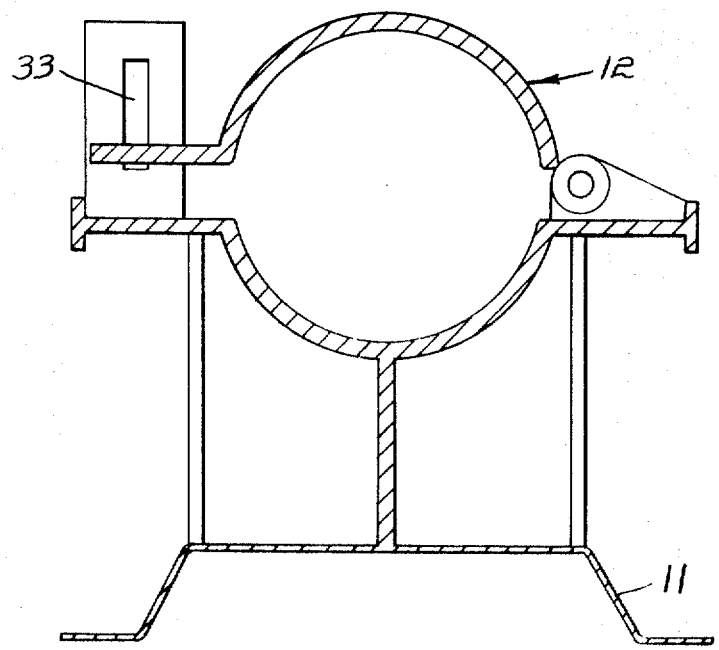
Figure 4:
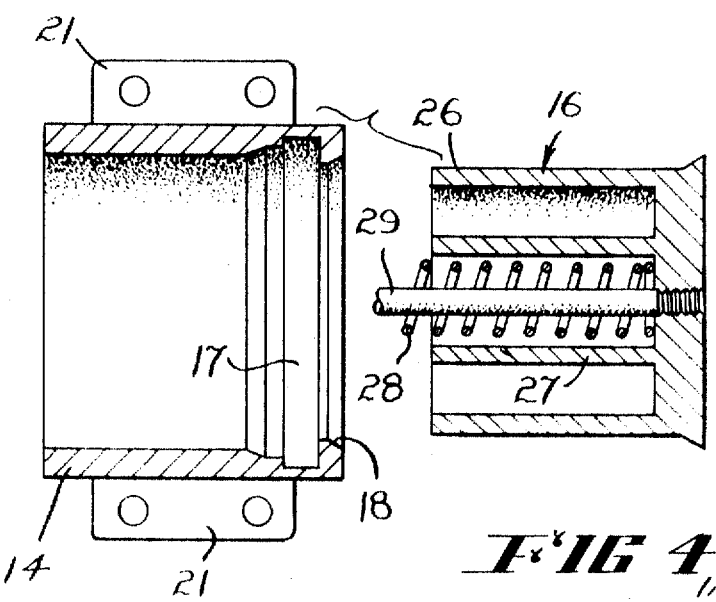

An embodiment of the invention is described hereunder in some detail with reference to and is illustrated in the accompanying drawings, in which:

FIG. 1 is a partly sectioned side elevation of a tool according to this invention, FIG. 2 is a partly sectioned plan, FIG. 3 is a section on line 3-3 of FIG. 1, and FIG. 4 is a detailed section showing the mold and die in "exploded" form.

According to this embodiment a tool 10 is provided with a frame 11 of general U-shape (FIG. 2). The two ends of the frame have extending between them an outer tube-engaging member constituted by a clamp 12 (shown in FIG. 3) which is arranged to clamp around a thermoplastic tube 13 and firmly grip it near its end. A second tube-engaging member 14, again a clamp, is positioned towards the bridge end 15 of the U-shaped frame 11 from the first clamp 12, and the second clamp 14 is in the form of two mold halves, and is associated with an inner cup-shaped die 16. The two mold halves have, when clamped together, an inner annular recess 17 which terminates at its mouth in an inwardly directed flange 18, arranged to abut the end of a pipe 13 when the clamp 14 is positioned thereon. The mold halves then provide space to accommodate plastic flow of the tubing. The mold halves are clamped together by screws 20 which pass through wings 21.

The cup-shaped die 16 is provided with a skirt 26 arranged to support the end of the tube against inward deformation during plastic flow. The die 16 also has a center tube 27 (except in its smaller sizes) which accommodates a spring 28 around a bolt 29 which carries an inner support 30, which is also a cup-shaped member, and which also supports the tube against inward deformation, when the clamp 12 is closed. This clamp is closed by a wedge 32 (FIG. 2) driven through slots 33 (FIG. 3).

The bridge 15 of the U-shaped frame 11 supports a hydraulic ram 35 which is hand operated (although of course other expansive devices can be used if desired) and when the mold is heated to a temperature above that at which plastic flow will take place (between 220° and 280° C.), the ram is operated to expand and thereby drive the mold back towards the clamp 12. This results in a plastic flow of material until the tube end fills the cavity of the mold to thereby form a protruding ring. The pressure is released, and after the mold has cooled to some extent it is opened and removed from the tube end, the clamp is released, and the die is withdrawn from the tube end. This then enables the tube to be joined to a standard fitting, or to another similarly formed tube, utilizing the standard nut and tail arrangement as employed in ordinary pipe-fitting practice. A typical clamp of this type is sold under the trademark Victaulic.

It has been found possible with a single tool to have replacement clamps, dies and molds to form a range of sizes, from 2-inch-diameter bore to 6-inch-diameter bore.

It will of course be seen that the use of screw-threaded means, or the use of an air cylinder in lieu of the hydraulic cylinder falls within this invention.

What I claim is:

1. A tool which is useful for forming a ring on the end of thermoplastic tubing, comprising a frame, a clamp carried on the frame near one end thereof, a mold constituted by two half molds arranged to be positioned over said end and secured thereto, an inner die having a skirt positionable within said end to support the tube against inward deformation and also having a flange cooperating with said mold to form therewith a die cavity which includes an annular recess, a bolt extending inwardly from the inner die and retaining for relative movement therewith an inner support arranged to be positioned within the tubing and in radial alignment with the clamp to prevent radially inward deformation of the tubing when clamped, a spring around the bolt, said inner support being slidable on the bolt but being urged away from the inner die by the spring and a ram carried on the frame reacting against the die to urge the die towards the clamp to thereby effect plastic flow of the tubing within the die cavity.